United States Patent [19]
Tanaka

[11] Patent Number: 5,903,539
[45] Date of Patent: May 11, 1999

[54] ELECTROMAGNETIC OBJECTIVE LENS DRIVING APPARATUS OF OPTICAL DATA RECORDING AND REPRODUCING APPARATUS

[75] Inventor: Akihiro Tanaka, Chiba-ken, Japan

[73] Assignee: Asahi Kogaku Kogyo Kabushiki Kaisha, Tokyo, Japan

[21] Appl. No.: 08/877,559

[22] Filed: Jun. 17, 1997

[30] Foreign Application Priority Data

Jun. 18, 1996 [JP] Japan ..................................... 8-156534

[51] Int. Cl.⁶ .................................. G11B 7/09; G11B 7/12
[52] U.S. Cl. ...................... 369/221; 369/44.15; 359/814; 359/819
[58] Field of Search ..................................... 369/215, 219, 369/221, 44.15, 44.16, 44.12, 44.14; 359/814, 823, 824, 819, 813

[56] References Cited

U.S. PATENT DOCUMENTS 3,109,053 10/1963 Ahearn .
4,079,192 3/1978 Josse ................................. 174/126 CP
5,243,919 9/1993 Ninomiya ................................. 104/281
5,321,678 6/1994 Takishima et al. .................. 369/44.14
5,414,563 5/1995 Tanaka ..................................... 359/814
5,418,772 5/1995 Tanaka ..................................... 369/219
5,455,811 10/1995 Tanaka ................................ 369/44.14
5,526,340 6/1996 Tanaka ..................................... 369/219
5,636,068 6/1997 Tanaka ..................................... 359/814

FOREIGN PATENT DOCUMENTS 63-064638 3/1988 Japan .
6-036937 2/1994 Japan .
6-96458 4/1994 Japan .
6-96469 4/1994 Japan .
6-349193 12/1994 Japan .

*Primary Examiner*—William J. Klimowicz
*Attorney, Agent, or Firm*—Greenblum & Bernstein P.L.C.

[57] ABSTRACT

An electromagnetic objective lens driving apparatus of an optical disc data recording and reproducing apparatus, includes a magnetic circuit which forms an electromagnetic driving circuit with focusing and tracking coils provided on an objective lens holder. The focusing coils and tracking coils comprise magnetic material that can be attracted by a magnetic force.

8 Claims, 10 Drawing Sheets

ELECTROMAGNETIC OBJECTIVE LENS DRIVING APPARATUS OF OPTICAL DATA RECORDING AND REPRODUCING APPARATUS

BACKGROUND OF THE INVENTION

1. Field of the invention

The present invention relates to an optical disc data recording and reproducing apparatus which optically writes data onto or reads data from an optical disc. More precisely, the invention relates to a driving apparatus which electromagnetically drives an objective lens thereof.

2. Description of related Art

In a known optical disc apparatus, such as an opto-magnetic disc apparatus, an objective lens is held on a carriage which is movable in a radial direction (i.e., tracking direction) of the optical disc to be movable in the tracking direction and the focusing direction through an elastic member. To drive the objective lens in the tracking direction and the focusing direction, tracking and focusing coils are provided on a lens holder, which holds the objective lens, and a magnetic circuit which constitutes electromagnetic driving circuits together with the tracking and focusing coils is provided on the carriage. The focusing and tracking coils are supplied with predetermined directions and intensities of electric current to drive the objective lens holder so as to accurately converge the laser beams onto the recording track of the optical disc.

In such an electromagnetic objective lens driving apparatus, it is necessary to make the carriage and lens holder as light as possible to quickly access a designated track and to perform precise focusing and tracking operations. Therefore making the carriage and the lens holder small and light has been a theme in recent years. On the other hand, a thrust power of the electromagnetic driving apparatus is effected by an effective length of coils which is the thrust source, and a magnetic flux density which effects the coils. Thus, when a movable portion and the magnetic circuits are made small and light, characteristic fluctuation occurs in a driving operation of the objective lens by the electromagnetic driving circuits because of the decrease of linearity of the magnetic flux density which effects the electromagnetic drive specifically, the movable portion, especially a form of the objective lens holder is not stable, so that it is difficult to perform precise focusing and tracking operations. To solve this problem, it is necessary to increase the magnetic flux density so as to improve the electromagnetic driving circuit.

FIG. 16 shows an example of an electromagnetic driving circuit. The magnetic circuit is formed by a magnetic yoke 2 which is substantially U shaped, with a permanent magnet 1 which is provided on one end of the inner surface of the yoke 2 in which a line of magnetic induction is designated "Φ". A coil 3 of which a cross section is shown is provided at a predetermined position in gap 4 in the magnetic circuit, and produces the thrust in directions of arrows A and B by supplying electric current thereto in the forward direction or the reverse direction vertical relative to the drawing surface. In the area in the vicinity of the gap 4, there is leakage of the magnetic flux 5 which does not effect the driving operation of the coil 3. To achieve highly efficient driving operation in such electromagnetic driving circuits mentioned above, it is necessary to converge the magnetic flux in the area of the gap 4, especially in the area of the efficient portion of the coil 3. For example, one characteristic of the magnetic flux is that it tends to converge a highly permeable magnetic member.

So, if a length of the gap 4 between the permanent magnet 1 and the yoke 2 is reduced, the magnetic flux density of the area of the gap 4 is increased compared with the area in the vicinity of the gap 4. However, when the length of the gap 4 is reduced by more than a predetermined length, it causes the cross section of coil 3 to be compressed. Namely, the thrust thereof becomes weakened because the effective length of the coil 3 decreases, or electric consumption is increased because of the increase of the resistance of the coil 3. Hence, reducing the length of the gap 4 is not preferable in view of improving the electromagnetic driving circuit.

In addition to that, to control an inclination of an optical axis of the objective lens which is driven at a high acceleration speed, the objective lens holder is elastically and movably supported in the focusing direction and the tracking direction on the carriage. In this elastic supporting mechanism, a damping member made of rubber is generally provided to supply damping resistance. However, in these elements, there have been problems such as imbalance of the resistance and deterioration of damping efficiency caused by temperature (temperature dependency). These cause the instability of the driving operation of the objective lens holder.

Apparatuses have been disclosed in U.S. Pat. No. 5,455,811 and U.S. Pat. No. 5,526,340 (disclosed by the same assignee of the present application) secure a high dynamic range, in the supporting mechanism for the objective lens which can be easily moved by a small driving force (low compliance), wherein the objective lens holder moving in a downward direction by the weight thereof can be prevented without supplying electric current to float the objective lens holder when the objective lens is not in a driving operation. These apparatuses are characterized by using an MID process (i.e., Molded Interconnection Device: which directly forms a printed circuit on a plastic injection molded product) to directly print an electric supplying circuit on a component which is made of the plastic injection molded product, with a magnetic force of the focusing and/or tracking permanent magnetos of the lens holder which is the component made by injection molding, to contain a magnetic material into an electric supplying printed circuit in a position where floating force (lifting force) is supplied to the objective lens holder. In this construction, when the objective lens holder is not in the driving operation, the weight of the objective lens holder can be at least partially and magnetically supported by the magnetic force of the permanent magnets on the carriage without supplying the electric current thereto, so that by supplying the magnetic force to the objective lens holder effectively to obtain the floating force in the area where the fluctuation of magnetic floating force is not easily effected, the magnetic circuit and the movable portion can be made small and light while maintaining the advantages in the above apparatuses.

In a positioning sensor which detects a position of the objective lens (especially in the tracking direction), since a photo sensor is generally utilized to detect a deviation of the objective lens from its neutral position based on light reflected by a reflecting surface which is provided on the objective lens holder, instability of the driving form of the object lens holder and the deviation from its neutral position hinders the accuracy in detecting the position of the objective lens.

SUMMARY OF THE INVENTION

The object of the present invention is to provide an electromagnetic objective lens driving apparatus in which maintaining stable and accurate driving operation of the movable portion including the objective lens holder can be achieved, and especially the characteristic fluctuation and the form (posture) fluctuation caused by the driving operation of the objective lens can be eliminated or reduced while satisfying needs of making the objective lens holder small and light at low cost.

According to the present invention, there is provided an optical data recording and reproducing apparatus characterized in applying magnetism to focusing and tracking coils which is provided on the objective lens holder to make the movable portion small and light. In other words, the focusing coil and the tracking coil comprises (includes) a magnetic member which can be magnetically attracted by a magnet. A stable driving operation can be obtained since a direction of a magnetic field vector for the magnetic member can be stable and the magnetic flux density can be increased when a magnetic member is placed in the area of the magnetic field of the electromagnetic objective lens driving apparatus.

The above optical data recording and reproducing apparatus comprises a carriage which is movable in a radial direction of an optical disc, an objective lens holder which supports an objective lens in a manner such that laser beams are converged onto the optical disc, and the objective lens holder being supported on the carriage and is elastically movable in focusing and tracking directions of the optical disc, focusing and tracking coils provided on the objective lens holder, and a magnetic circuit which constitutes an electromagnetic driving circuit with the focusing and tracking coils, wherein the focusing and tracking coils are applied magnetism.

In the optical data recording and reproducing apparatus comprising the above elements, when the objective lens holder is operated, self-posture stability of the objective lens holder can be achieved by supplying magnetism to the focusing and/or tracking coils. Thus, even characteristic non-linearity, which is caused by making the movable portion and the magnetic circuit small and light, is increased, the characteristic fluctuation and the posture fluctuation to the driving operation of the objective lens are not likely to occur, and laser beams converged by the objective lens can be accurately traced into a recording track of the optical disc.

Positioning the magnetic member in the magnetic field, especially at the center of the magnetic flux density (the center of the magnetic field), self-positioning restoration of the magnetic member can be obtained for the center of a magnetic flux distribution of the magnetic circuit. For this reason, in the above mentioned optical data recording and reproducing apparatus, when the focusing and/or tracking coils which are magnetically attracted by a magnet are positioned at the center of the magnetic field, an attractive force to move them towards the center of the magnetic flux density is constantly effected when the objective lens holder is operated In an elastic supporting mechanism of the objective lens, the self-positioning restoration can be damping resistance, and causes the magnetic damping effect. The damping effect by the magnetism is suitable for the driving portion of precision machines because there is no characteristic fluctuation such as the temperature dependency. Accordingly, making the electromagnetic driving apparatus small and light can be achieved since it is unnecessary to provide a damping apparatus with the damping member made of rubber. This elastic supporting mechanism is preferably constituted by a plurality of suspension wires which support the objective lens holder elastically and movably with one end thereof held on the objective lens holder and the other end thereof held on a supporting block, which is a fixing member on the carriage, to supply electric power to the focusing and tracking coils.

When the magnetic circuit has focusing and tracking permanent magnets, the focusing and/or tracking coils which have magnetism are provided in the area where the magnetic force of the permanent magnets supplies a certain floating force to the objective lens holder, so that a magnetic attractive force from the focusing and/or tracking permanent magnets can constantly be obtained without characteristic fluctuation occurring even if the objective lens holder and the magnetic circuit are made small and light, so that it is possible for the objective lens holder to be stably held at its neutral position.

In the electromagnetic driving apparatus further comprising a positioning sensor which detects the objective lens position based on the light reflected by the reflecting surface which is provided on the objective lens holder, the posture of the objective lens during the driving operation of the objective lens holder is stable and its neutral position is accurately maintained by applying magnetism to the focusing or (and) tracking coils, so that it is possible for the positioning sensor to accurately detect the position of the objective lens.

In the above mentioned construction, it is preferable to provide the focusing and/or tracking coils constituted by magnetic plating wires to make them small and light, and to reduce the number of the parts, thereby simplifying the assembling process thereof and lowering the cost at the same time. The magnetic plating wire is a leading wire on which an insulating layer (film), such as polyurethane, is provided after a copper wire is covered by a ferromagnetic layer (film) is The present disclosure relates to subject matter contained in Japanese Patent Application No. B-156534 (filed on Jun. 18, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 9:
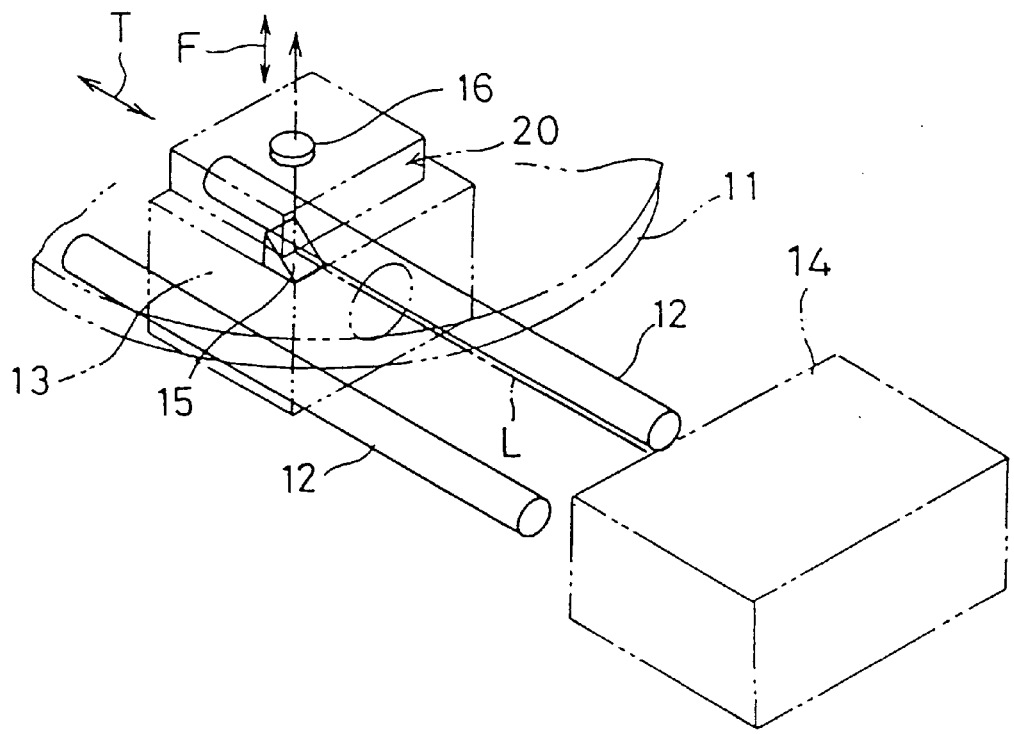
FIG. 9 in an isometric view of main components of an optical data recording and reproducing apparatus to which the present invention is applied.

As shown in FIG. 9, a pair of guide rails 12 which extend in the radial direction of an optical disc 11 are provided below the optical disc 11 which can be rotated. A carriage 13 is supported on guide rails 12 to move along the same. The carriage 13 is provided thereon with a prism 15 which reflects the laser beams L, incident thereon from an immovable optical system 14, in the vertical direction. The carriage 13 is further provided with an objective lens 16 which converges the laser beams reflected by prism 15 onto the recording surface of optical disc 11, and an electromagnetic driving mechanism 20 which drives objective lens 16 in the focusing and tracking directions F and T, respectively.

An objective lens holder 21 which holds objective lens 16 is made by plastic injection molding. As can be seen in FIGS. 1 through 5, lens holder 21 is provided on the center portion thereof with a cylindrical holder portion 21a which holds objective lens 16 and a pair of wings 21b which diagonally and symmetrically project from cylindrical holder portion 21a in the radial directions. Namely, wings 21b are aligned along an axis passing through the center of cylindrical holder portion 21a. The axis corresponds to the tracking direction T. Wings 21b are provided therein with coils receiving through holes 21c in which focusing coils 33 which are provided with magnetic plating wires wound thereabout are inserted and secured.

Focusing coils 33 lie in the plane in which wings 21b lie. Focusing coils 33 are provided with linear portions 33L extending in parallel with the tracking direction T.

Cylindrical holder portion 21a is provided on the outer surface thereof with two pairs of coil supporting projections 21d and 21e which project from both sides of cylindrical holder portion 21a in diagonal directions perpendicular to the tracking direction T. Upper coil supporting projections 21d are fitted in the center openings of tracking coils 34 which are provided with the magnetic plating wires wound thereabout. Lower coil supporting projections 21e support the lower surface of tracking coils 34 located thereon. Tracking coils 34 lie in respective planes parallel with the plane of focusing coils 33 and are provided with linear coil portions 34L extending in the focusing direction F.

Figure 17:
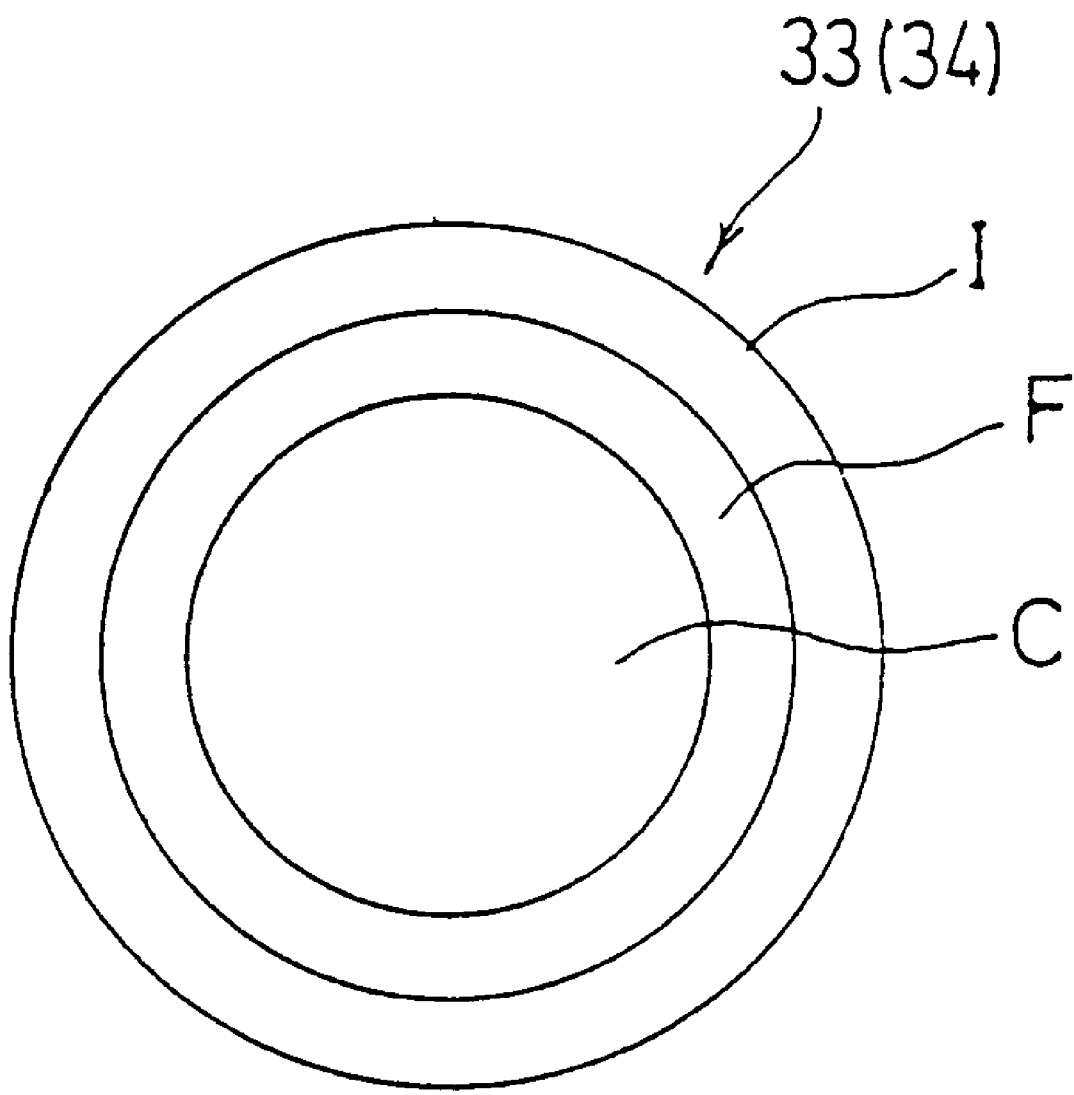
FIG. 17 is a conceptual sectional view of a magnetic plating wire which comprises focusing and tracking coils.

FIG. 17 shows a conceptual cross section of the magnetic plating wire which forms focusing coils 33 and tracking coils 34. The wire comprises a central copper wire C, a ferromagnetic layer (film) F which covers the copper wire C and an insulating layer (film) I, such as polyurethane, which covers the ferromagnetic layer F.

Figure 1:
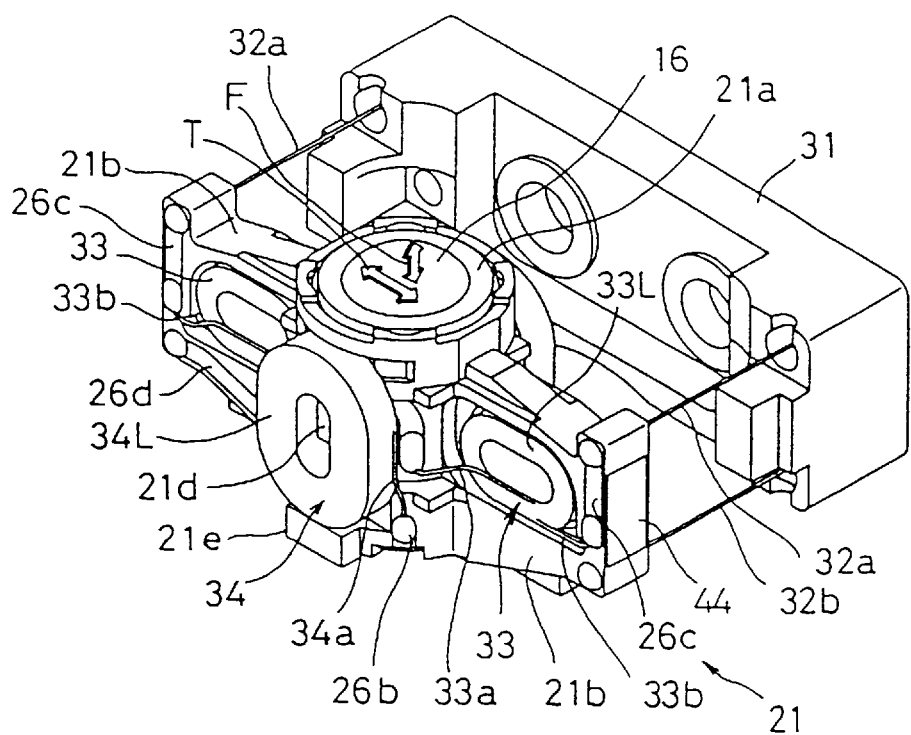
FIG. 1 is an isometric view of main components of an electromagnetic objective lens driving apparatus of an optical disc data recording and reproducing apparatus, according to the present invention.
Figure 2:
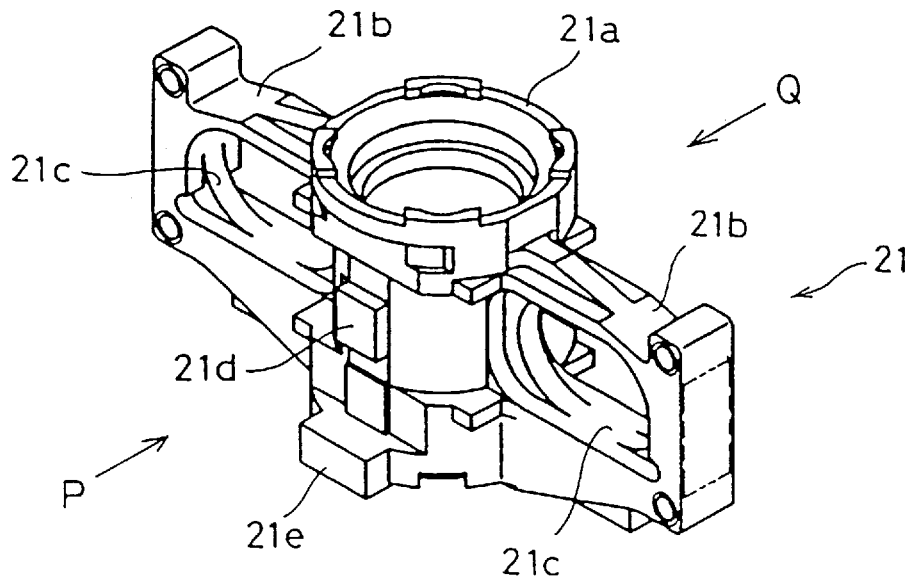
FIG. 2 is an isometric view of an objective lens holder according to the present invention.

Objective lens holder 21 is provided, on end surfaces thereon in the tracking direction T, with reflecting surfaces 44, as shown in FIG. 1. Reflecting surfaces 44 are directly formed on the end surfaces of wings 21b of objective lens holder 21, for example by the MID. The printed circuit is also formed directly on the outer surface of objective lens holder 21 to electrically connect focusing coils 33 in series or tracking coils 34 in series and to supply the focusing and tracking coils with electrical power, for example by the MID. Forming the printed circuit by the MID is shown in the prior art mentioned above.

Figure 3:
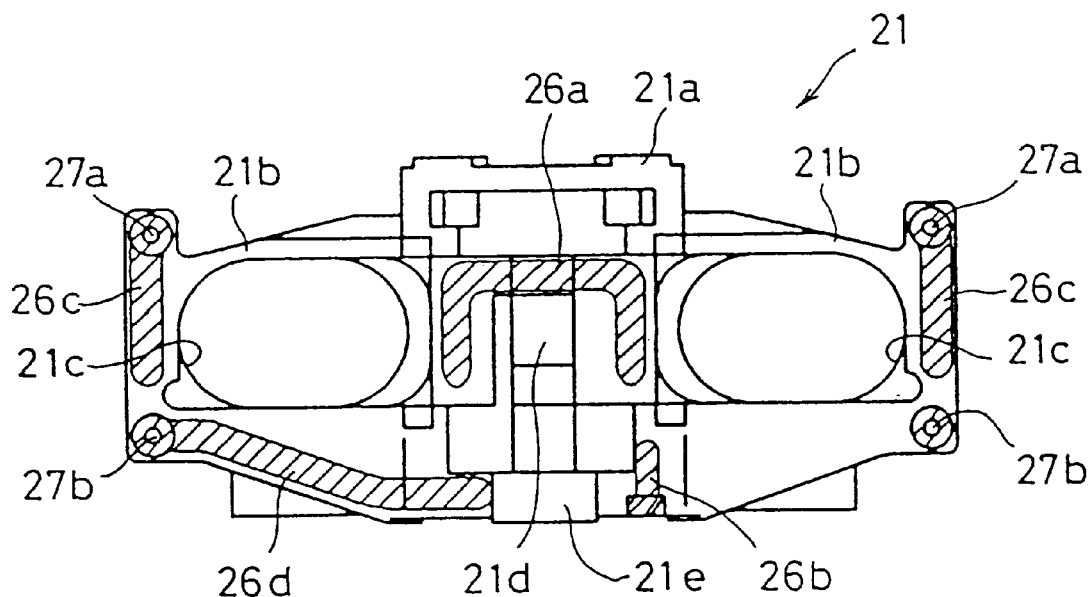
FIG. 3 is an end view of an objective lens holder viewed from the direction P shown in FIG. 2.
Figure 4:
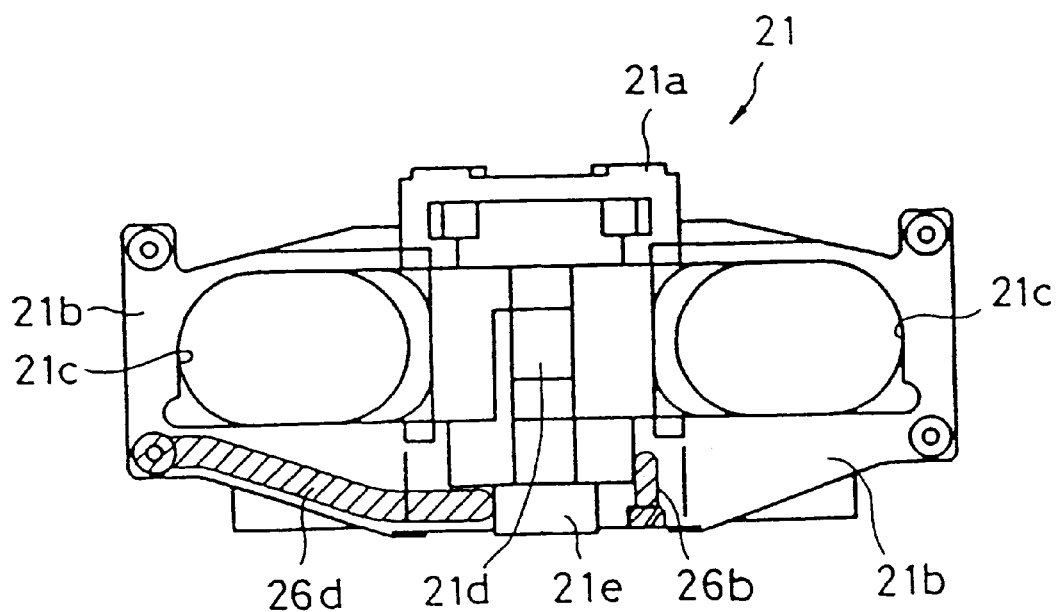
FIG. 4 is an end view of an objective lens holder viewed from the direction Q shown in FIG. 2.
Figure 5:
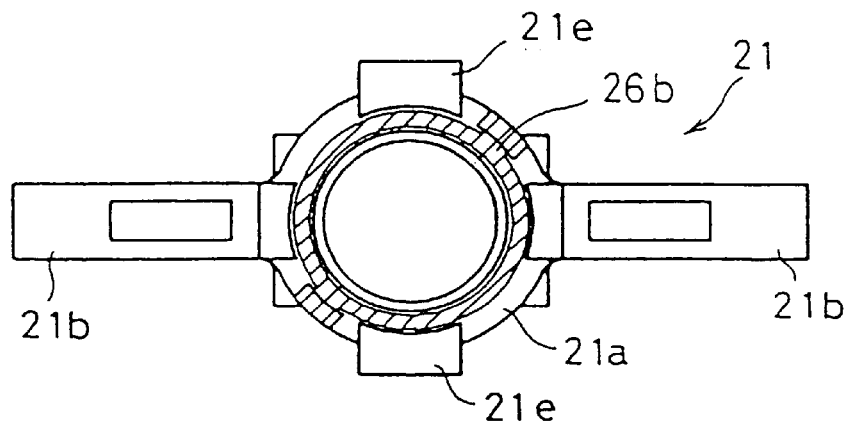
FIG. 5 is a bottom view of the objective lens holder shown in FIG. 2.

The printed circuit pattern is indicated by the diagonally lined portions in FIGS. 3 through 5. A first connecting portion 26a and current supply portions 26c are connected to a pair of focusing coils 33, and a second connecting portion 26b and power supply portion 26d are connected to a pair of tracking coils 34. Current supply portions 26c and power supply portion 26d extend to suspension wire connecting holes 27a and 27b, respectively, formed on the upper and lower ends of wings 21b.

Terminal ends 33a (FIG. 1) of the pair of focusing coils 33 are soldered to the ends of first connecting portion 26a. Other terminal ends 33b of focusing coils 33 are soldered to the corresponding current supply portions 26c. Similarly, terminal ends 34a of the pair of tracking coils 34 are soldered to the ends of second connecting portions 26d, and the other terminal ends (not shown) thereof are soldered to the corresponding power supply portion 26d, respectively.

Upper and lower suspension wires 32a and 32b are inserted in and soldered at one end thereof to the corresponding suspension wire connecting holes 27a and 27b. The pair of upper suspension wires 32a constitute a power supply line for the pair of focusing coils 33 connected in series, and the pair of lower suspension wires 32b constitute a power supply line for the pair of tracking coils 34 connected in series, respectively.

Figure 6:
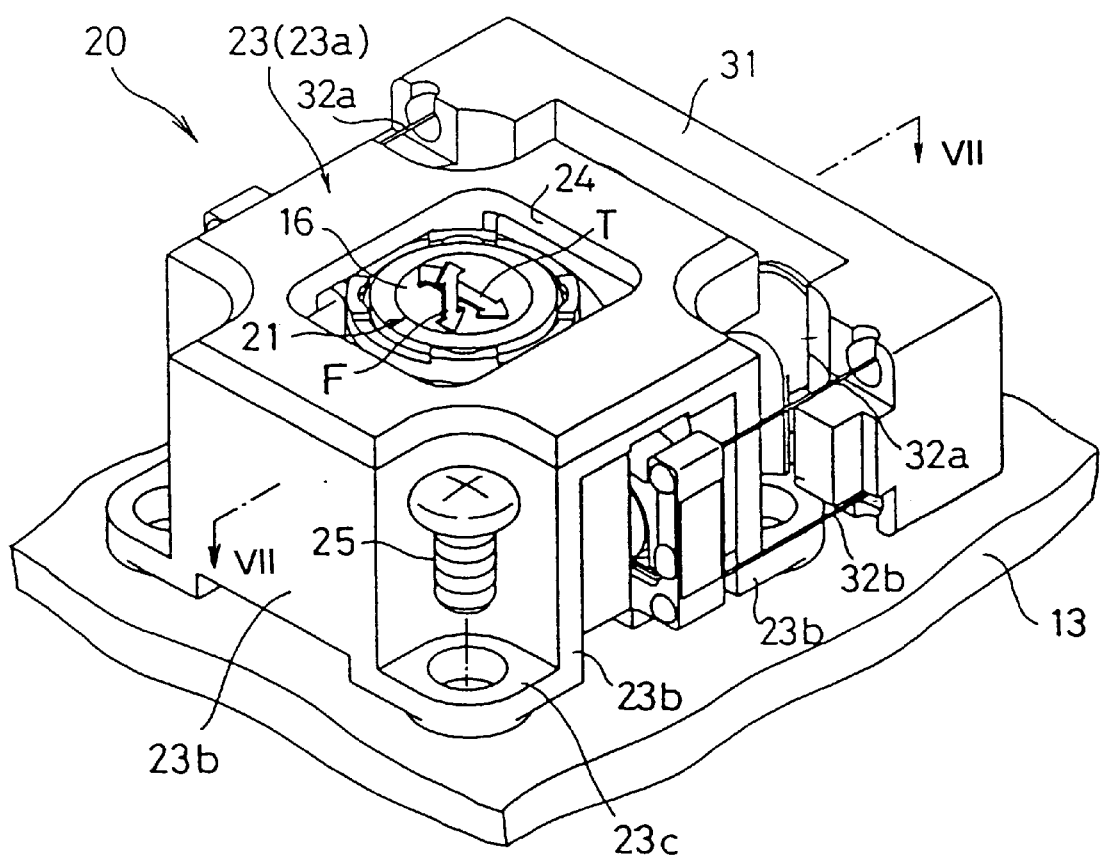
FIG. 6 is an isometric view of main components of an electromagnetic objective lens driving apparatus of an optical disc data recording and reproducing apparatus, according to another aspect of the present invention.
Figure 7:
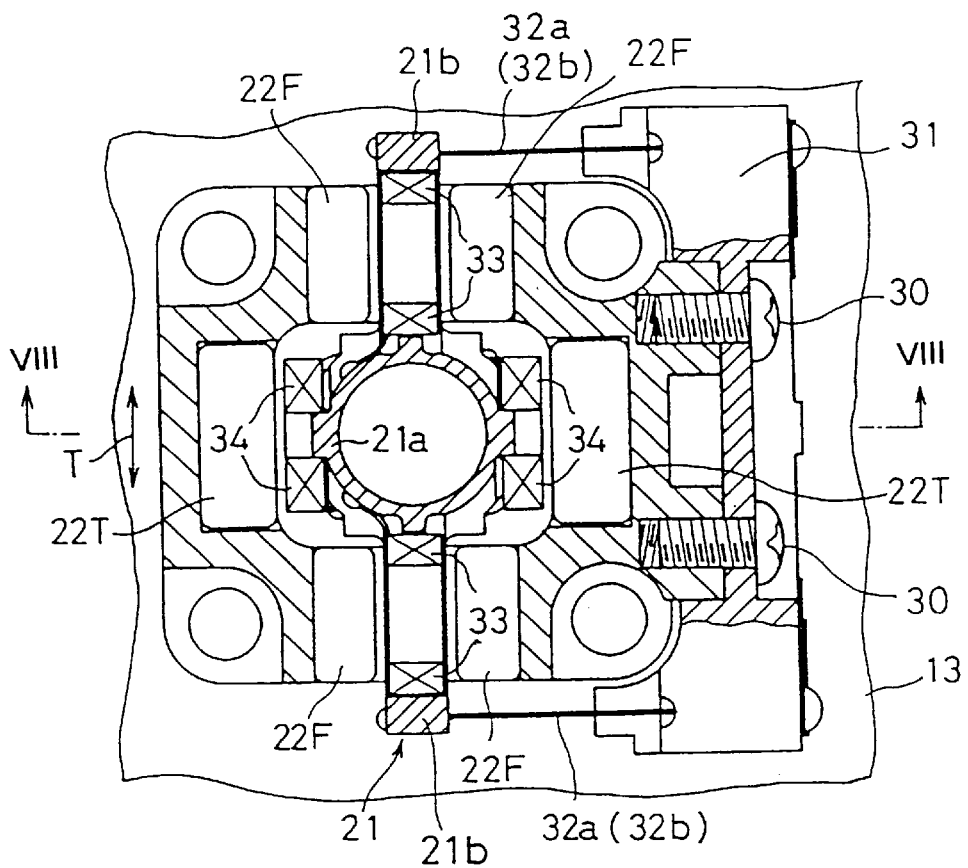
FIG. 7 is a sectional view along the line A—A in FIG. 6.
Figure 8:
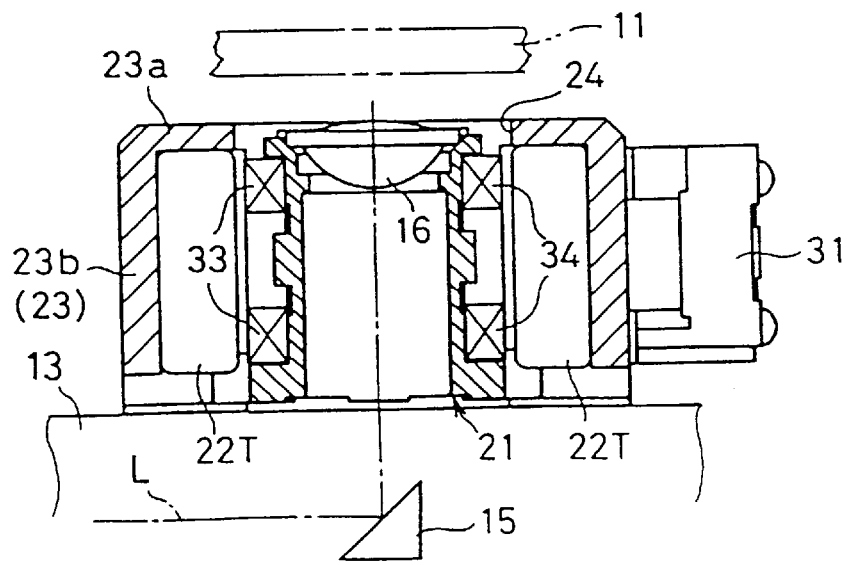
FIG. 8 is a sectional view along the line B—B in FIG. 7.

The magnetic circuit which constitutes electromagnetic driving circuits together with focusing coils 33 and tracing coils 34 is provided on carriage 13. The magnetic circuit is comprised of two pairs of focusing permanent magnets 22F, a pair of tracking permanent magnets 22T, and a yoke member 23 made of a magnetic material (as shown in FIGS. 6 through 8). The two pairs of the focusing permanent magnets 22F are located on opposite sides of each focusing coil 33 of each wing 21b. The two tracking permanent magnets 22T are located on opposite sides of cylindrical holder portion 21a, so that the two pairs of tracking coils 34 are placed between tracking permanent magnets 22T.

Figure 10:
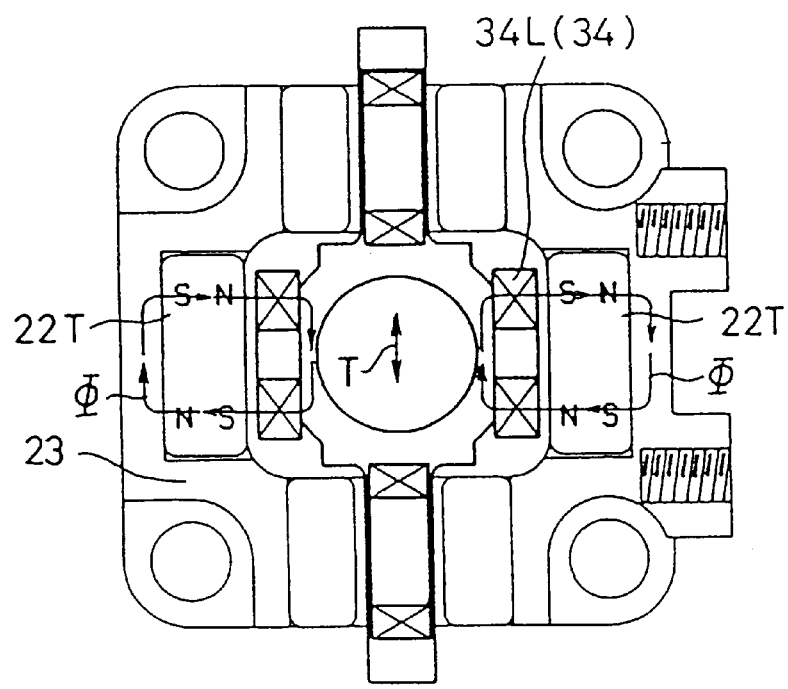
FIG. 10 is a plan view of a magnetic circuit of tracking permanent magnets which constitute an electromagnetic driving circuit, according to the present invention.
Figure 11:
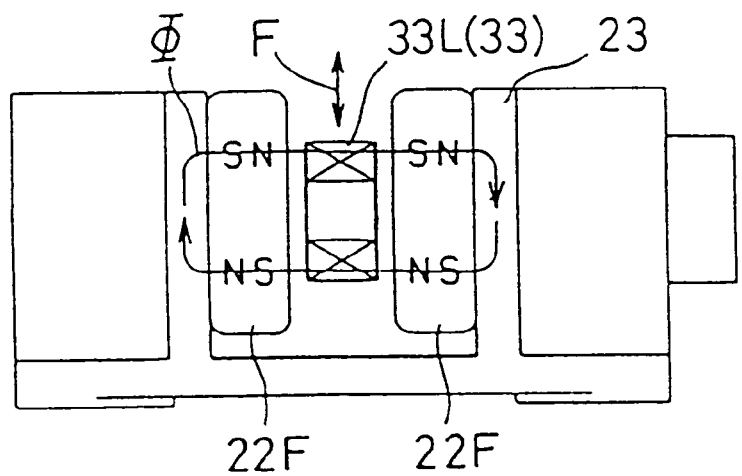
FIG. 11 is a plan view of a magnetic circuit of focusing permanent magnets which constitute an electromagnetic driving circuit, according to the present invention.
Figure 12:
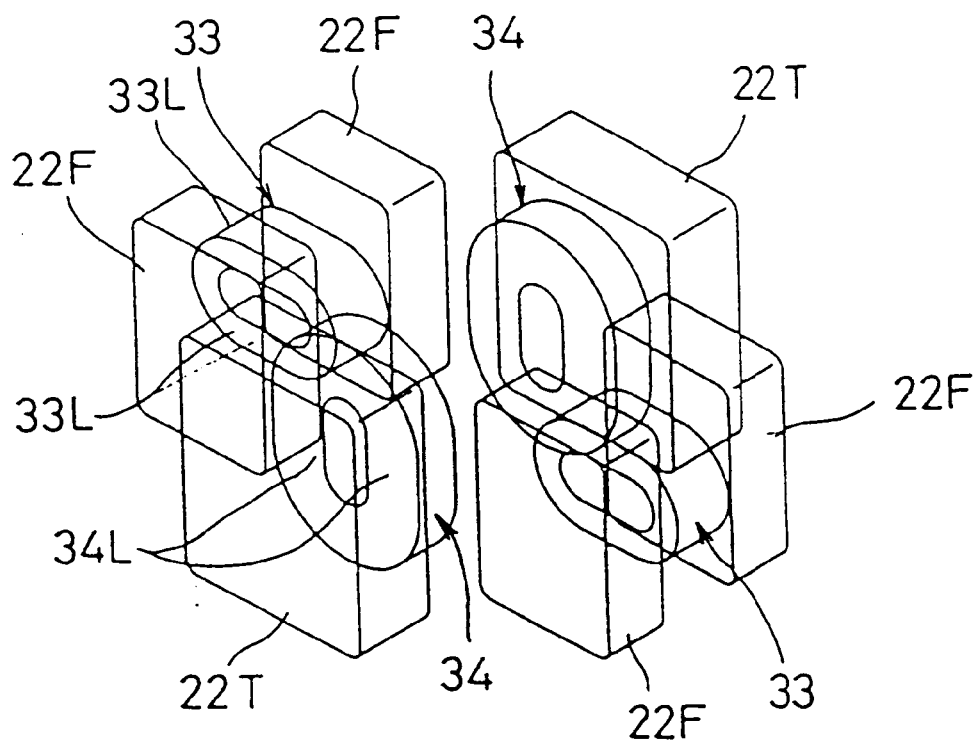
FIG. 12 is an isometric view of an arrangement of focusing and tracking coils and permanent magnets of an electromagnetic circuit, according to the present invention.

The arrangement of the focusing and tracking permanent magnets 22F and 22T and the polarities thereof are shown in FIGS. 10 through 12. The polarities of focusing and tracking permanent magnets 22F and 22T are such that linear coil portions 33L and 34L of focusing coils 33 and tracking coils 34 are perpendicular to the magnetic flux Φ produced by focusing permanent magnets 22F and tracking permanent magnets 22T. Consequently, the driving force in the focusing direction F (i.e., up and down directions) is produced in objective lens holder 21 in accordance with the electric current flowing in linear coil portions 33L in the forward or reverse direction. Similarly, the driving force in the tracking direction T (i.e., forward and reverse directions) is produced in objective lens holder 21 in accordance with the electric current flowing in linear coil portions 34L in the forward direction or the reverse direction thereof.

The focusing (i.e., focus controlling) electromagnetic circuit formed by focusing coils 33 and focusing permanent magnets 22F is arranged so as not to interfere with the tracking (i.e., tracking controlling) electromagnetic circuit formed by tracking coils 34 and tracking permanent magnets 22T. Consequently, no driving force in tracking direction T is produced in objective lens holder 21 by the electric current flowing in focusing coils 33, and no driving force in the focusing direction F is produced in objective lens holder 21 by the electric current flowing in tracking coils 34. Thus, precise and independent control in the tracking and focusing directions T and F can be achieved.

Yoke member 23, which supports focusing permanent magnets 22F and tracking permanent magnets 22T is comprised of a magnetic shield wall 23a opposed to the optical disc 11 in parallel therewith, a plurality of yoke walls 23b projecting perpendicularly from the peripheral edge of the magnetic shield wall 23a towards carriage 13, and a plurality of mounting flanges 23c which extend from yoke walls 23b and lie on carriage 13. Magnetic shield wall 23a, yoke wall 23b, and mounting flanges 23c are an integral structure. Magnetic shield wall 23a is provided with a laser transmission hole 24 in which objective lens 16 is movable, so that the laser beams L pass through laser transmission hole 24. Mounting flanges 23c are secured to carriage 13 by mounting screws 25. Supporting block 31 is secured to yoke member 23 by mounting screws 30 (FIG. 7).

The other ends of the suspension wires 32a and 32b are secured to supporting block 31. Supporting block 31 is made by plastic injection molding, and is provided with the electrical circuit printed directly thereon, by the MID process mentioned above in order to supply the electric power to suspension wires 32a and 32b. Objective lens holder 21 and, accordingly, objective lens 16 are movable in the focusing direction F and tracking direction T due to the elasticity of suspension wires 32a and 32b.

Figure 13:
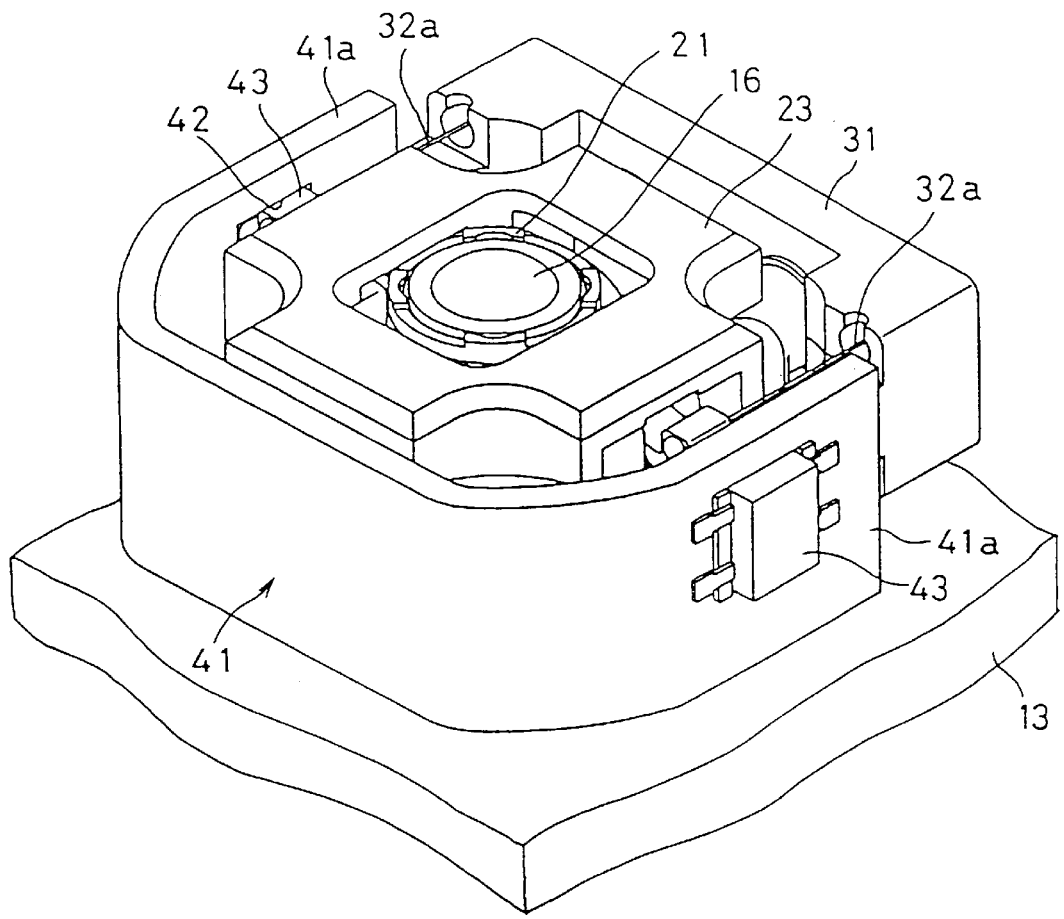
FIG. 13 is a front elevational view of a printed circuit of a supporting block.
Figure 14:
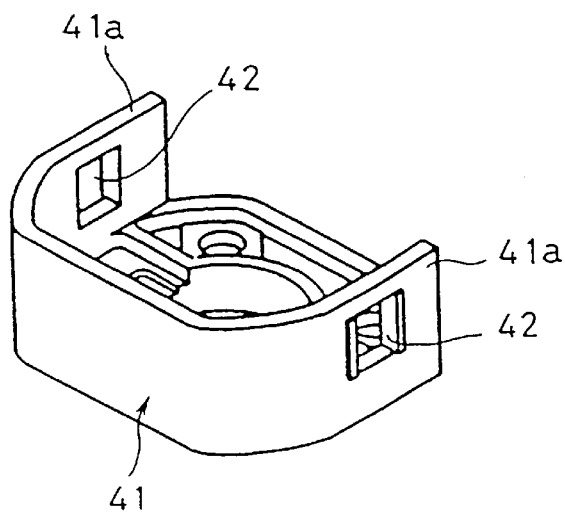
FIG. 14 is an isometric view of a sensor holder.

Referring to FIG. 13, sensor holder 41 which is adapted to detect the position of objective lens 16 (or objective lens holder 21) is also provided with a printed circuit. Sensor holder 41, which is secured to carriage 13 is generally U-shaped, to surround the three surfaces (including the two surfaces in the tracking direction T) of yoke member 23 which is generally rectangular in a plan view. Sensor holder 41 includes two opposed side walls 41a perpendicular to the tracking direction T, that are provided therein with sensor mounting windows 42, as shown in FIG. 14, in which a pair of reflection type photo sensors 43 are opposed to the corresponding reflecting surfaces 44 of objective lens holder 21. The pair of reflection type photo sensors 43 and the pair of reflecting surfaces 44 constitute a positioning sensor which detects the position of objective lens 16 in the tracking direction T.

Figure 15:
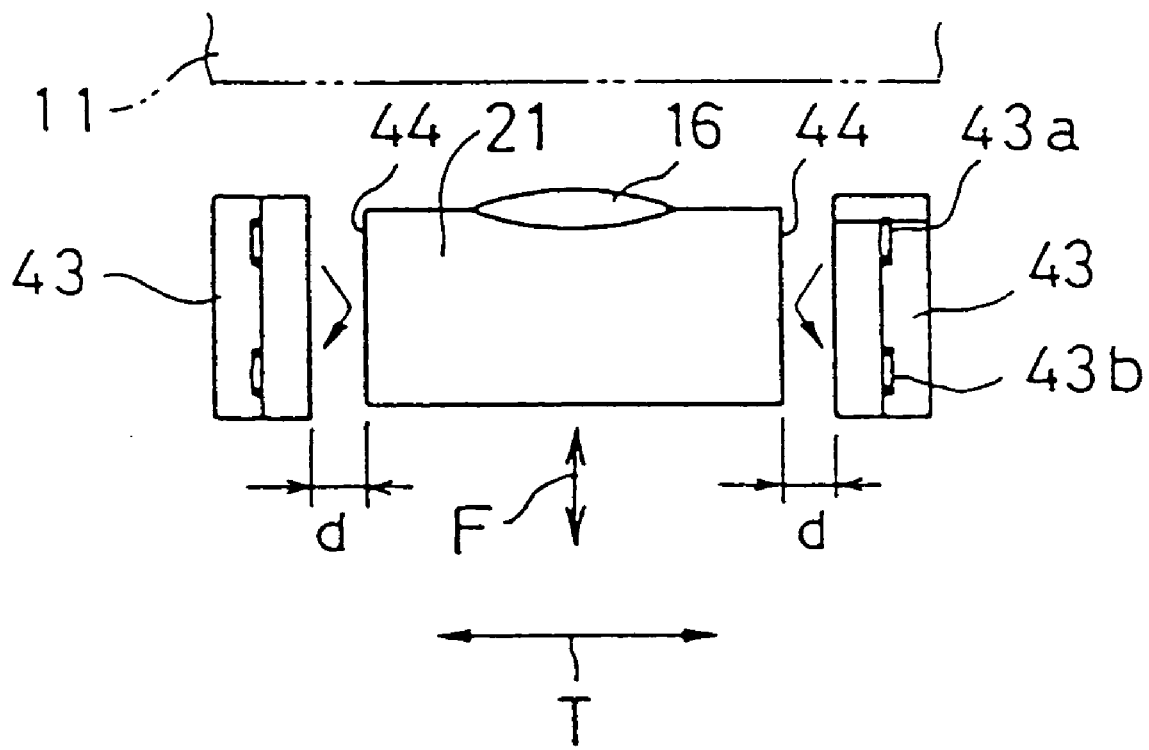
FIG. 15 is a front elevational view of a reflection type photo sensor and a reflecting surface of an objective lens holder.
Figure 16:
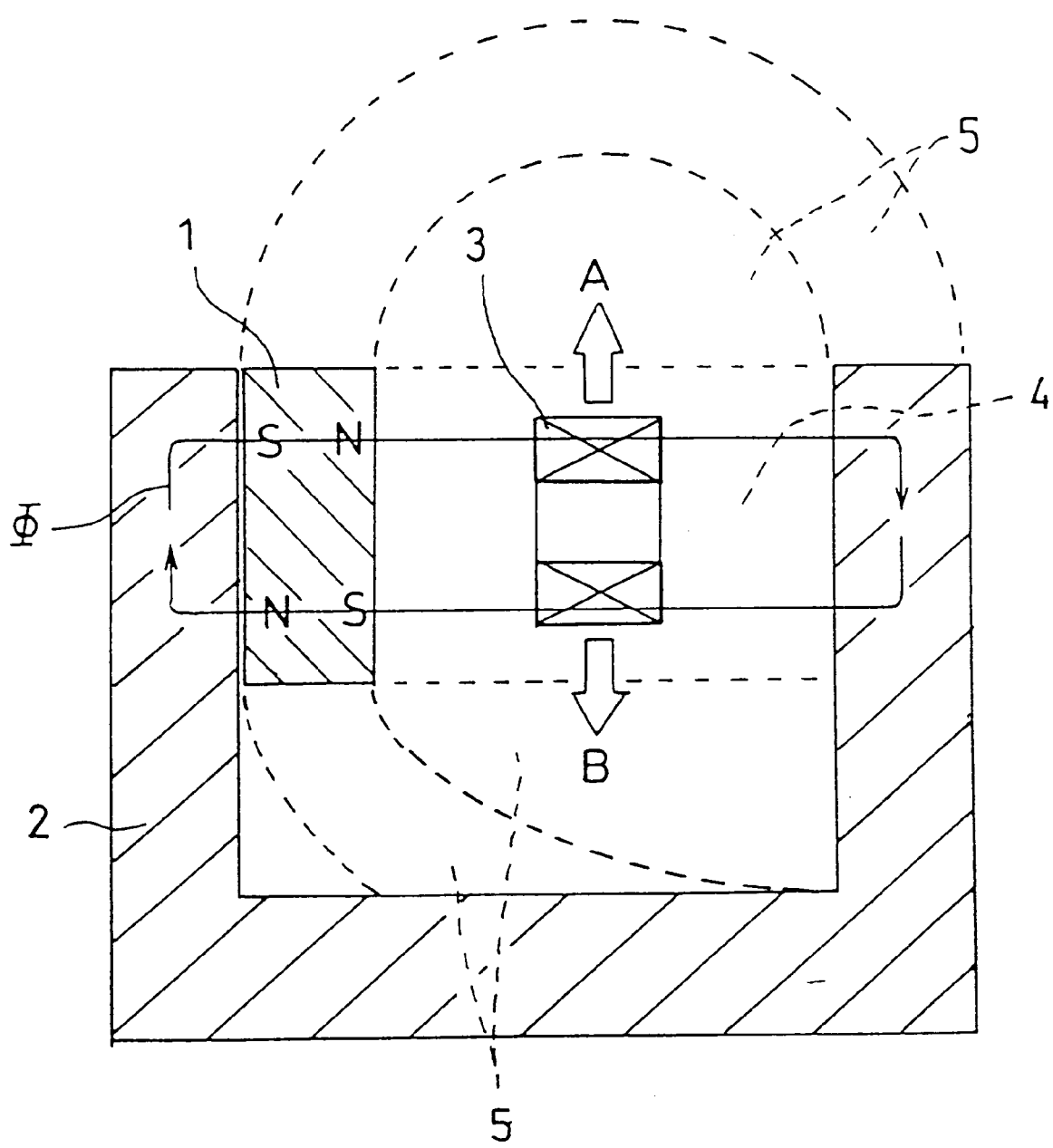
FIG. 16 is a sectional view of a magnetic circuit in the prior art.

FIG. 15 shows an outline of the positioning sensor. Each of the reflection type photo sensors 43 includes a light emitter 43a located near optical disc 11 and a light receiver 43b positioned away from optical disc 11, so that beams of light emitted from light emitters 43a are reflected by corresponding reflecting surfaces 44 and are then received by associated light receivers 43b. The light incident upon each light receiver 43b is input into a plus and minus input terminal of a differential amplifier (not shown) respectively through an output terminal (not shown). The output of the light receiver 43b varies by a change of the distance between the reflection type photo sensors 43 and the reflecting surfaces 44, so that the deviation of objective lens holder 21 (objective lens 16) from its neutral position in the tracking direction T can be detected.

In the electromagnetic driving mechanism 20 as constructed above, a movable portion (objective lens holder 21) in a magnetic field of the magnetic circuit can control characteristic fluctuation and form fluctuation for the driving mechanism thereof, by applying magnetism especially to focusing coils 33 and/or tracking coils 34 The arrangement of focusing permanent magnets 22F and tracking permanent magnets 22T, the condition where magnets are adhered, and a line of magnetic induction Φ are shown in FIGS. 10 through 12. FIG. 10 shows the polarity of tracking permanent magnets 22T. When objective lens holder 21 or tracking permanent magnets are made small and light, a direction of magnetic field vector for tracking coils 34 which is a thrust force thereof in the tracking direction T is unstable and magnetic flux density of the line of magnetic induction Φ is decreased. Consequently, the driving operation of objective lens holder becomes generally unstable. Contrary to this, when a magnetic member is positioned in the area of the magnetic field (in gap in the area of magnetic circuit), magnetic flux can be converged to the magnetic member, so that the same effect as providing an intermediate yoke in the magnetic field (proximity effect) can be achieved. Thus, in this embodiment, tracking coils 34 themselves have magnetism, so that the magnetic flux density for the tracking coils 34 is increased and the line of magnetic induction Φ (the direction of magnetic field vector) is stable. Consequently, the magnetic circuit can be efficiently operated and objective lens can be accurately and stably driven in the tracking direction T.

Additionally, since tracking coils 34 are positioned at the center of the magnetic field formed by tracking permanent magnets 22T, objective lens holder 21 has self-positioning restoration capability for the center of magnetic flux distribution of the magnetic circuit. The self-positioning restoration can be appropriate damping resistance and produces magnetic damper under the construction in which objective lens holder 21 is elastically and movably supported by suspension wires 32a and 32b.

However, as mentioned above, in view of the fact that permanent magnets are some of the constructional elements forming the magnetic circuit, the mechanism supplying floating force is disclosed to prevent the objective lens holder from moving in a downward direction by the weight thereof by providing a magnetic material onto the objective lens holder 21 when the objective lens is not in the driving operation. The advantages of the construction according to the present embodiment whose feature is making tracking coils 34 a magnetic member are as follows. Tracking coils 34 are placed in a position where floating force can be supplied by equal magnetic attractive force from tracking permanent magnets 22T which are opposed to each other as shown in FIG. 10 so that the objective lens holder can maintain its neutral position with magnetic force even when the objective lens is not operated, or the weight of the objective lens holder can be at least partially magnetically supported by the magnetic force. In this case, a deviation of the objective lens holder from its neutral position is not likely to occur, because a larger effective range to receive a magnetic attractive force can be produced as whole tracking coils 34 are a magnetic member.

In addition to that, the neutral position of objective lens holder 21 comprising the reflecting surfaces 44 and driving operation of objective lens holder 21 in the tracking direction T are stable, the positioning sensor constituted by the reflecting surface 44 and the reflection type photo sensors 43 can accurately detect the position of objective lens 16.

The present invention can be equally applied to the focusing direction F, and is preferably applied to both tracking and focusing directions T and F.

In the electromagnetic driving mechanism 20 as constructed above, when objective lens holder 21 is not in a driving operation, objective lens holder 21 is attracted in the upwards direction by the magnetic force of focusing permanent magnets 22F and/or tracking permanent magnets 22T so that objective lens holder 21 is positioned at its neutral position. To operate objective lens 16, a driving current for the focusing operation is supplied to focusing coils 33 through suspension wires 32a, and the driving current for the tracking operation is supplied to tracking coils 34 through suspension wires 32, respectively. When the focusing driving current is supplied to focusing coils 33, objective lens holder 21 and, accordingly, objective lens 16 are electromagnetically driven in the focusing direction F in accordance with the direction and intensity of the driving current supplied thereto. Similarly, when the tracking driving current is supplied to tracking coils 34, objective lens holder 21 and, accordingly, objective lens 16, are electromagnetically driven in the tracking direction T in accordance with the direction and intensity of the driving current supplied thereto. The driving operation can be accurately and stably achieved by forming magnetic plating wires on focusing coils 33 and/or tracking coils 34. The positioning sensor constituted by the reflecting surfaces 44 on objective lens holder 21 and the reflection type photo sensors 43 can accurately detect the position of objective lens 16. When objective lens 16 fluctuates more than a predetermined level, a feedback system (not shown) operates carriage 13 to eliminate tracking error in accordance with data of the accurate position of objective lens 16 from the positioning sensor. Accordingly, laser beams L converged by objective lens 16 can be correctly traced onto a recording track of optical disc 11.

In the embodiment mentioned above, the focusing and/or tracking coils are constituted by magnetic plating wires, but another method of applying magnetism onto coils can be applied.

As can be understood from the above discussion, according to the present invention, since the focusing coils and/or tracking coils contain magnetism, the direction of the magnetic field vector for the coils which is the thrust source of the objective lens is stable and the magnetic flux density is increased. Thus, the self-forming stability of the objective lens for the center of magnetic flux distribution of the magnetic circuit can be maintained, so that it is possible to improve the electromagnetic driving circuit of the objective lens. In addition to that, the objective lens holder which comprises the focusing and/or tracking coils containing magnetism has the self-positioning restoration capability for the center of the magnetic flux distribution, the magnetic damping effect in which no characteristic fluctuation occurs can be obtained. Accordingly, it is unnecessary to provide a particular damping member for the elastic supporting mechanism of the objective lens holder. Furthermore, by placing the magnetic focusing coils and/or tracking coils of the objective lens holder in the area of the carriage where the objective lens holder obtains a floating force created by the magnetic force of the permanent magnets on the carriage, it is possible to enhance the mechanical supporting intensity. Thus, according to the present invention, making the electromagnetic driving apparatus small and light at low cost can be achieved and the characteristic fluctuation and the posture fluctuation can be eliminated or reduced during the driving operation of the objective lens.

What is claimed is:

1. An electromagnetic objective lens driving apparatus of an optical disc data recording and reproducing apparatus, comprising:

a carriage that is movable in a radial direction of an optical disc;

an objective lens holder that supports an objective lens in a manner such that laser beams are converged onto the optical disc, said objective lens holder being supported on the carriage and movable in focusing and tracking directions of the optical disc;

focusing and tracking coils provided on the objective lens holder, the focusing and tracking coils being made of a magnetic material; and a magnetic circuit which forms an electromagnetic driving circuit with said focusing and tracking coils;

wherein said focusing coils and tracking coils comprise magnetic material that can be attracted by a magnetic force wherein said magnetic material of said focusing and tracking coils interacts magnetically with said magnetic circuit thereby at least partially allowing said objective lens holder to maintain a neutral position with respect to said magnetic circuit even when said focusing and tracking coils are not energized.

2. The electromagnetic objective lens driving apparatus of claim 1, wherein said magnetic circuit comprises focusing and tracking permanent magnets, and wherein said focusing coils and tracking coils are placed in a position where said focusing coils and tracking coils supply a floating force to said objective lens holder with a magnetic force caused by said focusing and tracking permanent magnets.

3. The electromagnetic objective lens driving apparatus of claim 1, wherein said magnetic plating wires comprise a central copper wire, a ferromagnetic layer and an insulation layer, arranged in this order from the center thereof.

4. The electromagnetic objective lens driving apparatus of claim 1, wherein said focusing coils and tracking coils are made of magnetic plating wires.

5. An electromagnetic objective lens driving apparatus of an optical disc data recording and reproducing apparatus, comprising:

a carriage that is movable in a radial direction of an optical disc;

an objective lens holder that supports an objective lens in a manner such that laser beams are converged onto the optical disc, said objective lens holder being supported on the carriage and movable in focusing and tracking directions of the optical disc;

focusing and tracking coils provided on the objective lens holder, said focusing and tracking coils generating magnetism, the focusing and tracking coils being made of a magnetic material; and a magnetic circuit that includes focusing and tracking permanent magnets, said magnetic circuit forming an electromagnetic driving circuit with said focusing and tracking coils wherein the magnetic material of said focusing and tracking coils interacts magnetically with said magnetic circuit thereby at least partially allowing said objective lens holder to maintain a neutral position with respect to said magnetic circuit even when said focusing and tracking coils are not energized.

6. The electromagnetic objective lens driving apparatus of claim 5, wherein said focusing coils and tracking coils are placed in a position where said focusing coils and tracking coils supply a floating force to said objective lens holder with a magnetic force caused by said focusing and tracking permanent magnets.

7. The electromagnetic objective lens driving apparatus of claim 5, wherein said magnetic plating wires comprise a central copper wire, a ferromagnetic layer and an insulation layer, arranged in this order from the center thereof.

8. The electromagnetic objective driving apparatus of claim 5, wherein said focusing coils and tracking coils are made of magnetic plating wires.

* * * * *

UNITED STATES PATENT AND TRADEMARK OFFICE
CERTIFICATE OF CORRECTION

PATENT NO. : 5,903,539

DATED : May 11, 1999

INVENTOR(S) : Akihiro Tanaka

It is certified that error appears in the above-identified patent and that said Letters Patent is hereby corrected as shown below:

Column 4, line 60, change "A-A" to --VII-VII--.

Column 4, line 61, change "B-B" to --VIII-VIII--.

Signed and Sealed this

Ninth Day of November, 1999

Attest:

Q. TODD DICKINSON

*Attesting Officer*　　　*Acting Commissioner of Patents and Trademarks*